United States Patent [19]
Itoh

[11] Patent Number: 5,142,636
[45] Date of Patent: Aug. 25, 1992

[54] MEMORY BANK ADDRESS CALCULATION WITH REDUCED INSTRUCTION EXECUTION CYCLES

[75] Inventor: Sakae Itoh, Hyogo, Japan

[73] Assignee: Mitsubishi Denki Kabushiki Kaisha, Tokyo, Japan

[21] Appl. No.: 678,894

[22] Filed: Mar. 28, 1991

Related U.S. Application Data

[63] Continuation of Ser. No. 144,455, Jan. 15, 1988, abandoned.

[30] Foreign Application Priority Data

Jan. 15, 1988 [JP] Japan .................. 62-19438

[51] Int. Cl.⁵ ............................ G06F 9/32
[52] U.S. Cl. ............... 395/400; 364/DIG. 1;
    364/251.1; 364/254.3; 364/255.4; 364/787;
    364/788; 365/230.03; 365/238.5
[58] Field of Search ........... 364/200, 900, 787, 788;
    365/230.03, 238.5; 395/400, 425

[56] References Cited

U.S. PATENT DOCUMENTS 3,993,891  11/1976  Beck et al. .................... 364/787
4,573,137   2/1986  Ohhashi ....................... 364/788

FOREIGN PATENT DOCUMENTS 60-14337   3/1985  Japan .
60-77238  11/1985  Japan .
61-156434  2/1986  Japan .
61-251933  4/1986  Japan .

OTHER PUBLICATIONS

An Intro to Digital & Analog IC Applications by S. Mitra 1980, pp. 111-115.
Intel, The 8080/8085 Microprocessor Book, pp. 22-23, p. 8, 1980.

Primary Examiner—Gareth D. Shaw
Assistant Examiner—John C. Loomis
Attorney, Agent, or Firm—Townsend and Townsend

[57] ABSTRACT

A microcomputer in which a higher address must be corrected according to a carry or borrow signal generated during address computation for memory reference based on each addressing mode. The microcomputer is provided with a databank register for holding the higher address and a temporary register for storing a value obtained by incrementing or decrementing by one digit the contents of the data bank register so that the higher order address may be corrected with neither increase in the number of instruction executing cycles nor loss of the memory area continuity.

4 Claims, 7 Drawing Sheets

FIG.3
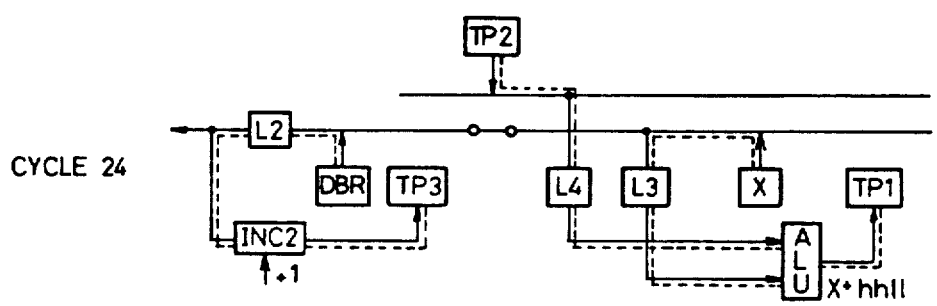
CYCLE 24
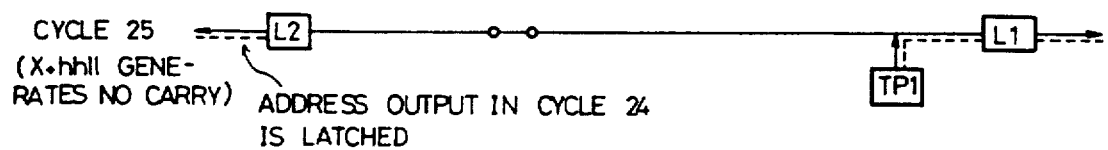
CYCLE 25
(X+hhll GENE-
RATES NO CARRY)  ADDRESS OUTPUT IN CYCLE 24
IS LATCHED
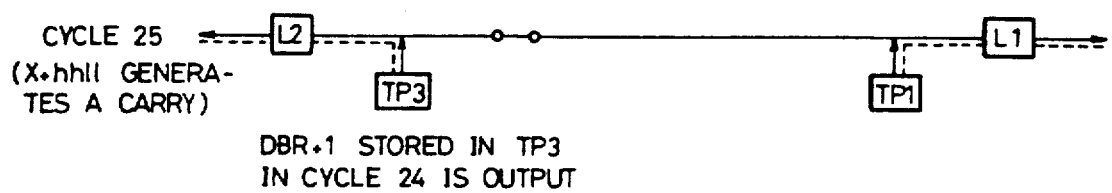
CYCLE 25
(X+hhll GENERA-
TES A CARRY)
DBR+1 STORED IN TP3
IN CYCLE 24 IS OUTPUT

MEMORY BANK ADDRESS CALCULATION WITH REDUCED INSTRUCTION EXECUTION CYCLES

This is a continuation of application Ser. No. 07/144,455 filed Jan. 15, 1988, now abandoned.

BACKGROUND OF THE INVENTION

The present invention relates generally to data processing system and, more particularly, to a data processing system capable of correcting the higher order address when a carry or borrow signal is generated in address computation.

FIG. 6 shows the central processing unit (CPU) of a conventional microcomputer. It is assumed that the address width and data bus width are 24 and 16 bits, respectively. The CPU includes a program counter (PC) 1, a program bank register (PBR) 2, a data bank register (DBR) 3, address latches (L1 and L2) 5 and 6, address adders (INC1 and INC2) 7 and 8, an arithmetic and logic unit (ALU) 21, and buses for connecting these devices. The PC 1, and the PBR 2 and DBR 3 are a 16-bit register and 8-bit registers, respectively. The PBR 2 holds the most significant 8 bits ($AD_{16}$-$AD_{23}$) of an address in the program area while the DBR 3 holds values in the most significant 8 bits of an address in the data area, respectively. Consequently, the program fetch is carried out from the address at which the most significant 8 bits $AD_{16}$-$AD_{23}$ are designated by the contents of the program bank register and $AD_0$-$AD_{15}$ are designated by the contents of the program counter. On the other hand, the data fetch is carried out from the address at which $AD_{16}$-$AD_{23}$ and $AD_0$-$AD_{15}$ are designated by the contents of the DBR 3 and the values determined by the operation of the CPU in execution of the instruction, respectively.

The CPU further includes various 16-bit registers 10-18; namely, a temporary register (TP1) 10 for temporary storing the results of computation in the ALU 21, accumulators (A and B) 11 and 12, and index registers (X and Y) 13 and 14, a stack pointer (S) 15, a direct page register (D) 16, a processor status register (PS) 17, and a temporary register (TP2) 18 for temporary storing data fetched into the CPU from the data bus, and internal bus latches 19 and 20. Symbols o and o represent gates responsive to a control signal from the control section to open when the reference clock is a logic level low "L" and a logic level high "H", respectively.

The operation of the CPU will be described by way of the execution of an instruction Load Accumulator A (LDA) in an absolute X addressing mode. This instruction is composed of one byte of operation code and two bytes of operand. A first address part identified by the sum of the contents of the X register and the operand are used as a low part of an address to be combined with a second address part stored in DBR 3 to provide an entire address. This entire address is used to access data which is loaded into accumulator A.

The timing chart for execution of this instruction is shown in FIG. 7. In cycles 30 and 31, the operation code and the operand are fetched, and the operation code is decoded. At the same time, the previous instruction is executed in these cycles. Consequently, the LDA instruction is executed from the next cycle 32, in which the 2-byte operand (hhll) fetched in the TP2 in the previous cycle and the contents of the X register are added in the ALU 21 and the sum is stored in the TP1. In the next cycle 33, the values of this TP1 and the DBR are output at $AD_0$-$AD_{15}$ and $AD_{16}$-$AD_{23}$, respectively, and the contents of this address is fetched in the TP2. In the cycle 34, the fetched value is transferred to the TP1 to check the flag. In the cycle 35, it is stored in the accumulator A. Thus, the execution of the LDA instruction in the absolute X addressing mode is completed in four cycles.

However, there is a problem when a carry signal is generated upon addition of the contents of the X register and the operand hhll in the cycle 32. The 16-bit addition in the ALU 21 generates a carry signal in the second half of the cycle 32 so that there is not sufficient time to input it to the address adder 8 of FIG. 6 to increment by one digit the value of the DBR 3 in the same cycle.

One solution is to ignore all carry signals. However, this results in loss of the continuity in the memory area, which is disadvantageous for programming purposes. Another solution is to provide after the cycle 32 another cycle for computing the value of the DBR 3 and a carry signal in the ALU 21. This makes the execution time one cycle longer.

SUMMARY OF THE INVENTION

Accordingly, it is an object of the invention to provide a microcomputer capable of performing address addition including a carry in the bank register without any increase in the number of cycles for the execution an instruction and any loss of continuity in the memory area.

According to the invention there is provided a microcomputer which includes a temporary register as well as respective program and data bank registers and a control unit for controlling these registers so that the contents of the PBR or DBR incremented or decremented by one digit may be stored in the temporary register in the cycle that the ALU performs address addition or subtraction and, in the next cycle, either of these values is output as an address depending on which signal, carry or borrow, is generated as a result of the address computation in the ALU, thus not only eliminating the cycle for correcting the higher order address but also ensuring the memory area continuity.

Other objects, features, and advantages of the invention will be apparent from the following description taken in conjunction with the accompanying drawings.

BRIEF DESCRIPTION OF THE DRAWINGS

FIG. 3 is a diagram showing signal flows in the CPU of FIG. 1;

DESCRIPTION OF THE PREFERRED EMBODIMENTS

Figure 1:
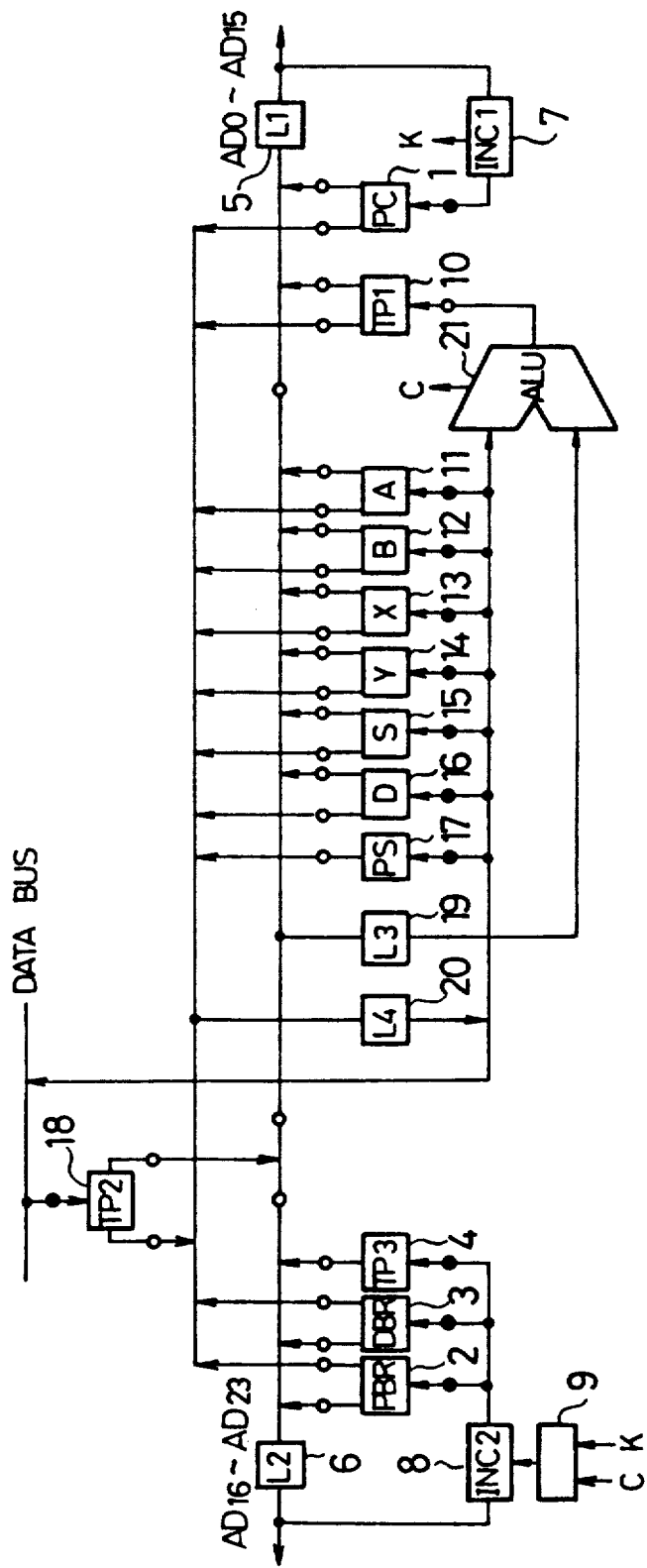
FIG. 1 is a block diagram of the CPU of a microcomputer according to the invention.

FIG. 1 shows the CPU of a microcomputer according to the invention. In this embodiment, the address and data bus widths are 24 and 16 bits, respectively. The CPU includes various registers, latches, an ALU, and internal buses for connecting these devices. That is to say, it includes a program counter (PC) 1, a program bank register (PBR) 2, a data bank register (DBR) 3, and a temporary register (TP3) 4 for temporarily storing the value incremented or decremented by one digit of the program bank register 2 or data bank register 3. The PC 1, and the PBR 2, DBR 3, and TP3 4 are 16-bit and 8-bit registers, respectively. The program bank register 2 holds the most significant 8 bits ($AD_{16}$–$AD_{23}$) of an address in the program area and the data bank register 3 holds the most significant 8 bits of an address in the data area. Consequently, the program fetch is carried out from the address at which $AD_{16}$–$AD_{23}$ and $AD_0$–$AD_{15}$ are designated by the contents of the program bank register 2 and program counter 10, respectively. On the other hand, the data fetch is carried out from the address at which $AD_{16}$–$AD_{23}$ and $AD_0$–$AD_{15}$ are designated by the contents of the data bank register 3 and the value determined by the operation of the CPU during execution of the instruction, respectively.

The CPU further includes an arithmetic logic unit (ALU) 21, address latches (L1 and L2) 5 and 6, address adders (INC1 and INC2) 7 and 8, and a bank address ($AD_{16}$–$AD_{23}$) control unit 9 into which carry signals K and C are input from the address adder 7 and the ALU 21, respectively, and various 16-bit registers 10–18; namely, a temporary register (TP1) for temporarily storing the computation results of the ALU 21, accumulators (A and B) 11 and 12, and index registers (X and Y) 13 and 14, and a stack pointer (S) 15, a direct page register (D) 16, a processor status register (PS) 17, a temporary register (TP2) 18 for temporarily storing data taken into the CPU from the data bus, and internal bus latches (L3 and L4) 19 and 20. Symbols o and o are gates responsive to a control signal from the control section to open when the reference clock of the CPU is a logic level high "H" and a logic level low "L", respectively.

The operation of the microcomputer of the invention will be described. For example, how the CPU executes an instruction Load Accumulator A (LDA) in an absolute X addressing mode will be described. This instruction is composed of one byte of operation code and two bytes of operand and instructs that the contents of the address at which $AD_0$–$AD_{15}$ and $AD_{16}$–$AD_{23}$ are the sum of the 2-byte operand and the X-register contents, and the value of the data bank register, respectively, be stored in the A register. The timing chart for execution of this instruction and the signal flows within the CPU in cycles 24 and 25 are shown in FIGS. 2 and 3, respectively.

Figure 2:
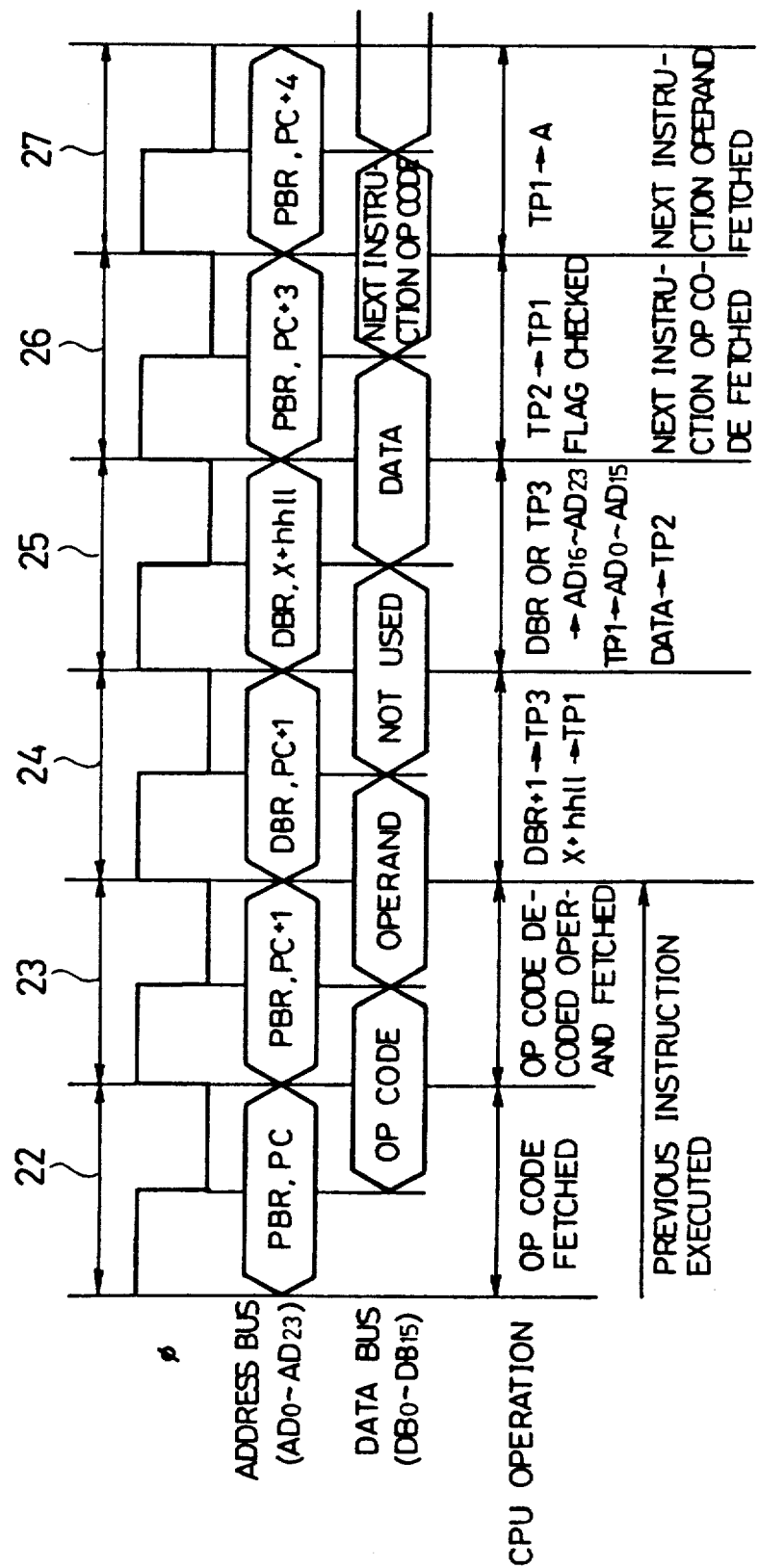
FIG. 2 is a timing chart for execution of an instruction by the CPU of FIG. 1.

In FIG. 2, in cycles 22 and 23, the operation code and the operand are fetched and the operation code is decoded. At the same time, the previous instruction is executed in these cycles. Consequently, the LDA instruction is executed from the next cycle 24, in which the 2-byte operand (hhll) fetched in the temporary register (TP2) 18 and the contents of the X register are added in the ALU 21 and the sum is stored in the temporary register (TP1)10. At the same time, the contents of the data bank register 3 are incremented by one digit and stored in the temporary register (TP3) 4.

In the cycle 25, the contents of the temporary register 1 is output at $AD_0$–$AD_{15}$ while the address of the previous cycle or value of the data bank register 3 is latched when the addition (X+hhll) in the previous cycle generates no carry signal or the value "data bank register+1" in the temporary register 3 is output at $AD_{16}$–$AD_{23}$ when a carry signal is generated. The contents of the address designated with $AD_0$–$AD_{23}$ is stored in the temporary register 2. In cycles 26 and 27, the fetched data is transferred to the temporary register 1 for flag checking and then stored in the accumulator A to complete execution of the instruction.

Figure 4:
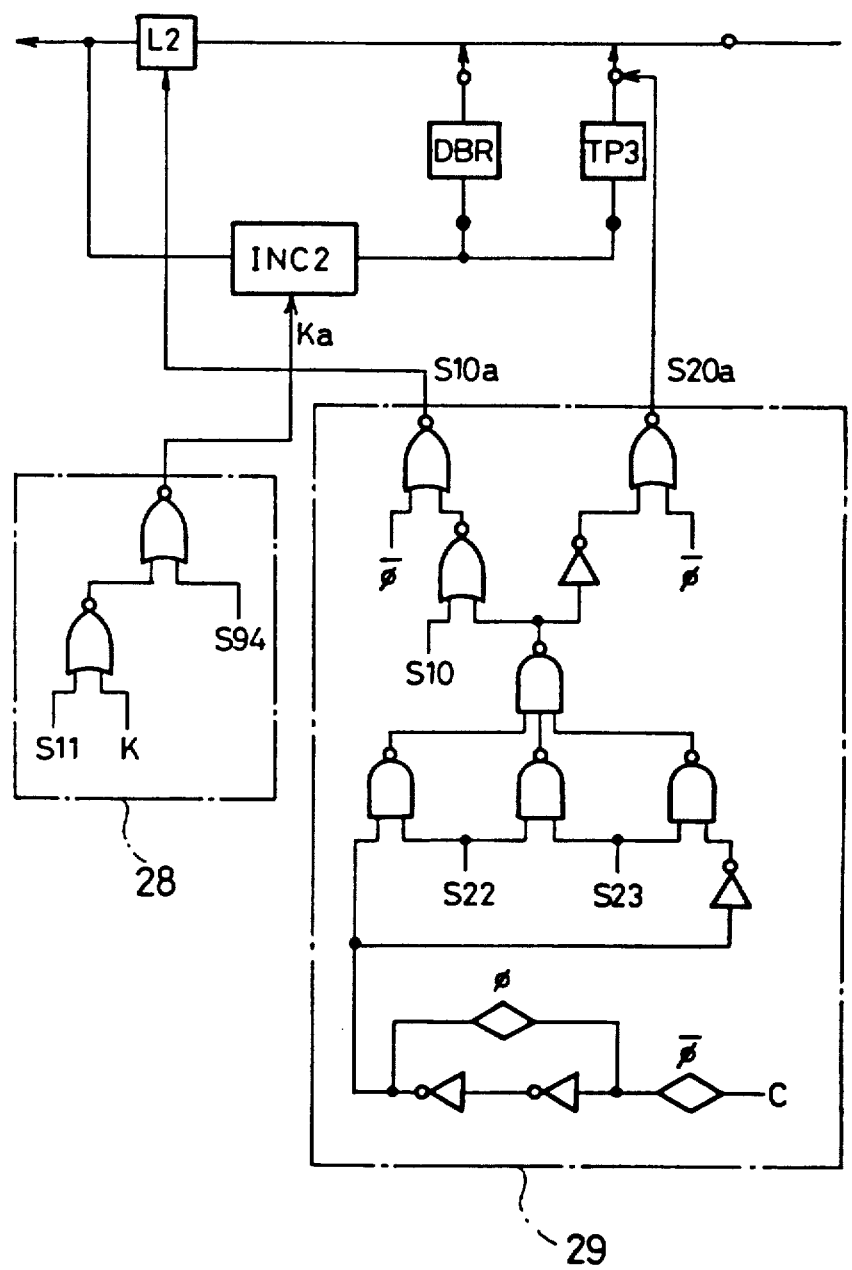
FIG. 4 is a logic diagram of an address control circuit.
Figure 5:
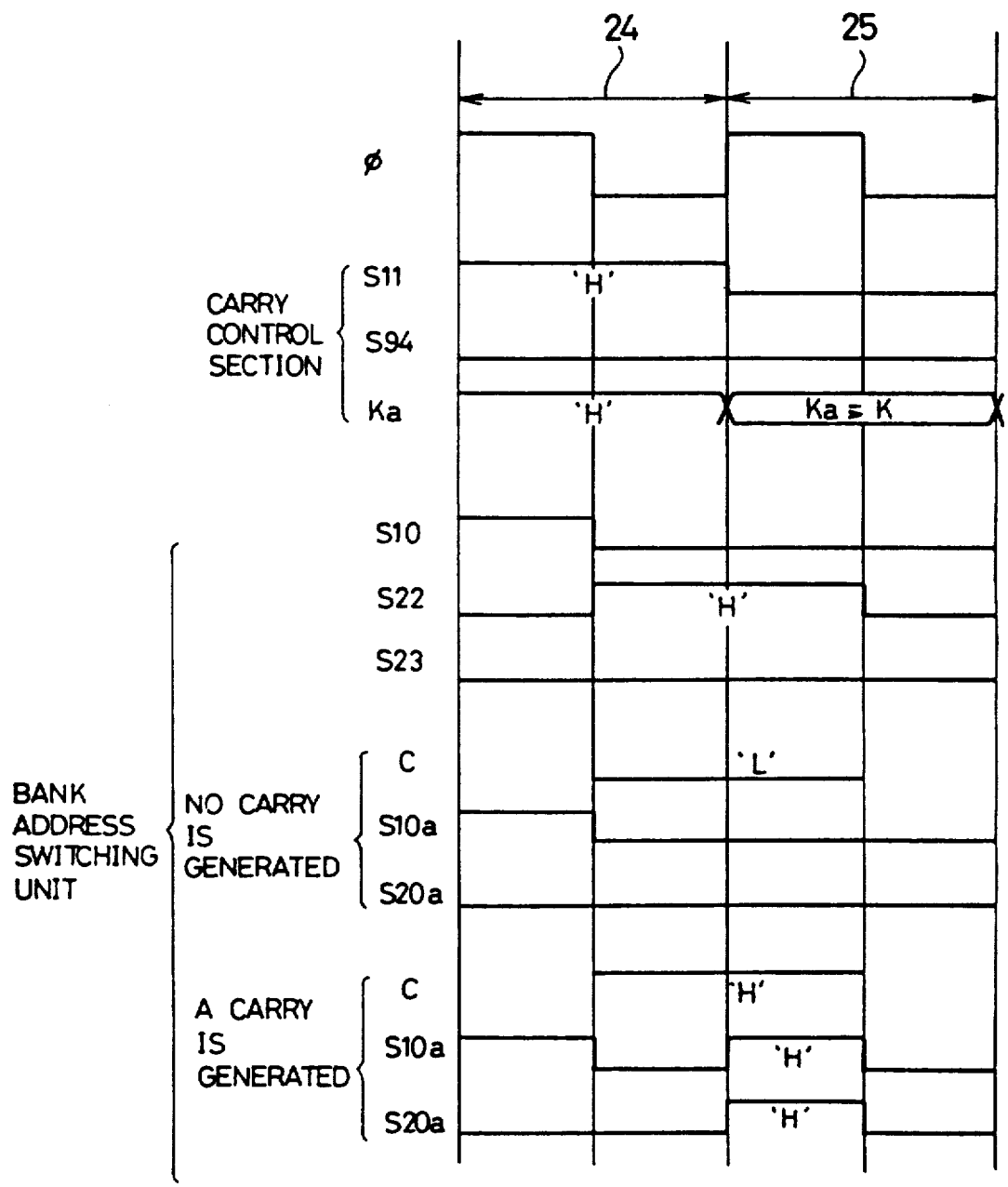
FIG. 5 is a timing chart for the address control circuit of FIG. 4.
Figure 6:
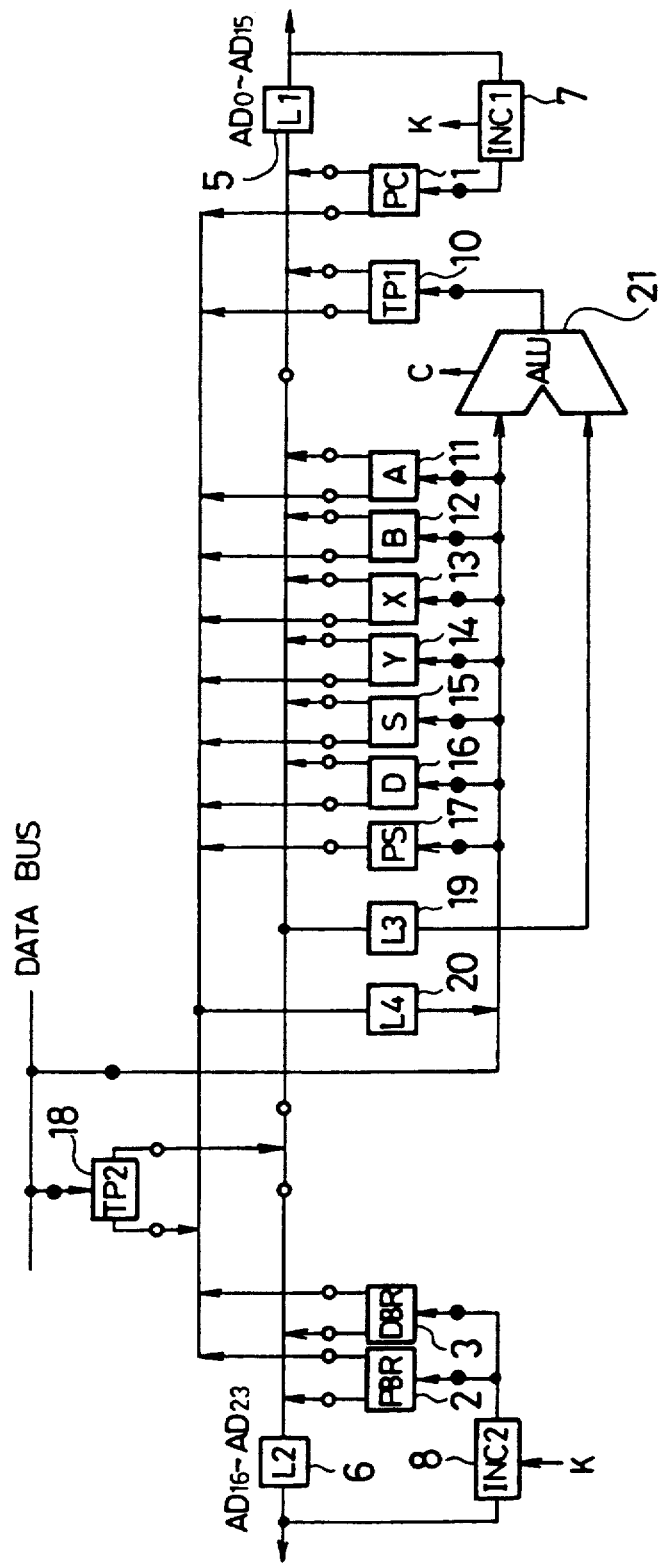
FIG. 6 is a block diagram of the CPU of a conventional microcomputer.
Figure 7:
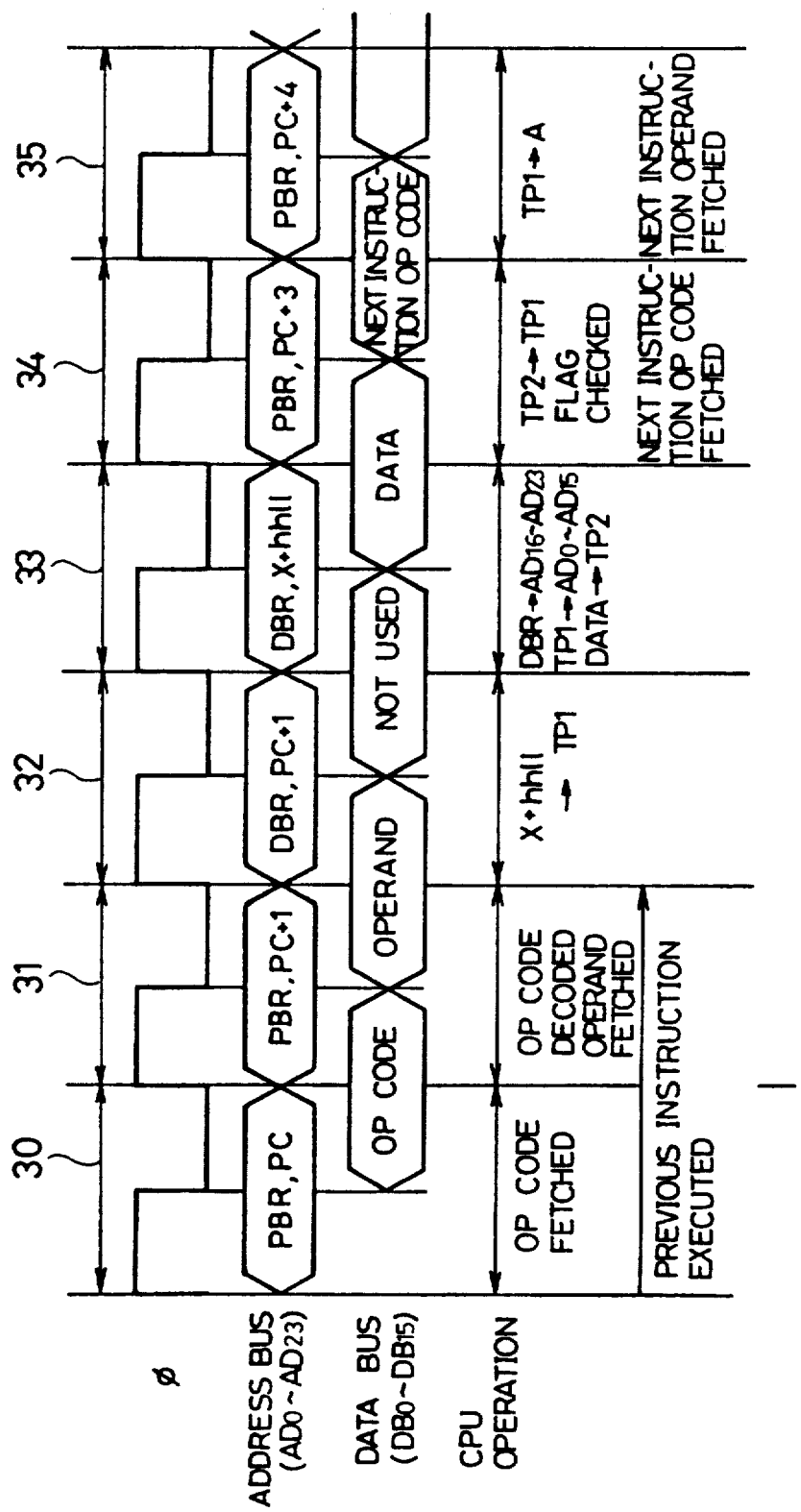
FIG. 7 is a timing chart for execution of an instruction by the CPU of FIG. 6.

The operation of the bank address control unit 9 in FIG. 1 for controlling the address to be output at $AD_{16}$–$AD_{23}$ in the cycles 24 and 25 will be described in more detail. FIGS. 4 and 5 show a logic diagram of the control unit 9 and the timing chart for operation of this unit in the cycles 24 and 25, respectively. The bank address control unit 9 consists of a carry control unit 28 and an address switching unit 29. Control signals S11 and S94 from the CPU control section and a carry signal K from the address adder 7 of FIG. 1 are input to the carry control unit 28. Normally, S11 and S94 are "L", and a carry signal K from the address adder (INC1) 7 is input to the address adder (INC2) 8.

On the other hand, when S11="H" and S94="L" in the cycle 24 of FIG. 2, the input Ka to the address adder 8 is forced to be a logical "1". Consequently, when the value of the data bank register 3 is input to the address adder 8 via L2, it is incremented by one digit and stored in the temporary register (TP3) 4. When S94="H", Ka is forced to be "0". This is used for loading data in the program bank register 2 or data bank register 3.

The address switching unit 29 receives control signals S10, S22, and S23 from the control section and a carry signal C from the ALU 21 and outputs a signal S10a for controlling the address latch L2 and a signal 20a for controlling the read gate of the temporary register 4. In the cycle 25 of FIG. 2, this switching unit operates as follows. It is in the second half of the cycle 24 to determine whether a carry signal C is generated ("1") or not ("0") as a result of the addition (X+hhll) in the ALU 21. The control unit latches this value in Φ and holds until φ="H".

On the other hand, the control signals become S22="H" and S23="L" in the period between φ="L" of the cycle 24 and φ="H" of the cycle 25. Consequently, when a carry signal is generated (C=1), both S10a and S20a are "H" for φ="H" of the cycle 25 so that the value of the temporary register 4 or value of the data bank register +1 is output on the address bus. Conversely, when no carry signal generated (C=0), both S10a and S20a are "L" so that the value of the previous cycle 24 (in the data bank register 3) is latched on the address bus. Thus, the bank address may be switched without increasing the number of instruction execution cycles.

If S22="L" and S23="H" in this control unit, the contents of the temporary register 4 are output on the address bus when C="0" while the previous address is latched when C="1" in contrast to the operation in the cycle 25. Thus, when a borrow signal is generated in the address subtraction in the ALU (C=0), the bank address is decremented by one digit.

While the carry operation in the absolute X addressing mode has been described, this principle is applicable to other addressing modes where a carry or borrow signal from the higher order address is generated in the address computation in the ALU, thus making address switching possible without providing an additional execution cycle for correction of the higher order address. That is to say, according to the invention, the higher order address may be corrected without providing an additional execution cycle while keeping the continuity in the whole memory space addressable in the address bus width.

While a preferred embodiment of the invention has been described using specific terms, such description is for illustrative purposes only, and it is to be understood that changes and variations may be made without departing from the spirit and scope of the appended claims.

What is claimed is:

1. A method for reducing instruction execution cycles in addressing operations in a microcomputer, comprising the steps of:
   storing a higher part of an address generated in a previous cycle in a data bank register;
   fetching an arithmetic operation code in a first cycle;
   fetching an arithmetic operand into a first temporary register, and decoding said arithmetic operation code in a second cycle;
   adding said arithmetic operand to a content of a first register with an arithmetic logic unit and storing the sum in a second temporary register in a third cycle;
   incrementing the content of said data bank register and storing the result in a third temporary register during said third cycle;
   placing a content of said second temporary register on a first part of an address bus; and
   placing on a second part of said address bus, the content of said data bank register when no carry signal is generated by the arithmetic logic unit, or the content of said third temporary register when a carry signal is generated, by said arithmetic logic unit, in a fourth cycle.

2. A microcomputer with reduced instruction execution cycles during address addition and subtraction, comprising:
   an arithmetic logic unit for performing the addition and subtraction of an operand to and from a particular address located in a first register, placing a result in a first temporary register, and generating one of a carry and a borrow signal, during a first cycle;
   a data bank register for holding a higher part of an address having a higher and a lower part;
   a carry control unit, responsive to a first plurality of control signals from a CPU and a carry signal from an address adder, with an output coupled to an incrementor, for incrementing said higher address when in a particular mode set by said control signals, and placing a result in said data bank register during said first cycle;
   a temporary data bank register, coupled to said carry control unit, for storing said incremented value of said higher address; and
   an address switching unit, coupled to said data bank register and to said temporary data bank register, and responsive to a second plurality of control and timing signals from said CPU and said carry signal from said ALU, for selecting a particular higher address from one of said temporary data bank register if a carry signal is generated by said ALU, and said data bank register if a carry signal is not generated by said ALU, and combining said particular higher part of address with said result in said first temporary register and outputting said combined address on an address bus during a second cycle.

3. The microcomputer of claim 2, wherein said carry control unit receives two control signals from said CPU for selecting one of three modes of operation, a first normal addressing mode coupling said carry signal from said address adder to said incrementor, a second change of address mode coupling a logical high to said incrementor for automatic incrementation, and a third data loading mode coupling a logical low to said incrementor during loading operations.

4. The microcomputer of claim 2, wherein said address switching unit receives three control signals from said CPU for selecting one of a plurality of modes including addition and subtraction.

* * * * *